US009832375B2

(12) United States Patent
Mercier et al.

(10) Patent No.: US 9,832,375 B2
(45) Date of Patent: Nov. 28, 2017

(54) VIDEO IMAGE RECOVERY FROM TRANSIENT BLOCKAGE OR CORRUPTION ARTIFACTS

(71) Applicant: BAE Systems Information and Electronic Systems Integration Inc., Nashua, NH (US)

(72) Inventors: Michael N. Mercier, Nashua, NH (US); Joseph M. Schlupf, Newburyport, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 148 days.

(21) Appl. No.: 14/918,096

(22) Filed: Oct. 20, 2015

(65) Prior Publication Data

US 2016/0112647 A1    Apr. 21, 2016

Related U.S. Application Data

(60) Provisional application No. 62/066,404, filed on Oct. 21, 2014.

(51) Int. Cl.
*H04N 5/232* (2006.01)
*G06T 5/00* (2006.01)
*G06T 5/50* (2006.01)

(52) U.S. Cl.
CPC ......... *H04N 5/23229* (2013.01); *G06T 5/005* (2013.01); *G06T 5/50* (2013.01); *G06T 2207/10016* (2013.01); *G06T 2207/30232* (2013.01)

(58) Field of Classification Search
CPC .......... H04N 5/23229; H04N 5/23232; H04N 5/357; G06T 5/005; G06T 5/50; G06T 2207/30232; G06T 2207/10016
See application file for complete search history.

(56) References Cited

U.S. PATENT DOCUMENTS

| | | | |
|---|---|---|---|
| 8,451,910 B1 * | 5/2013 | Lohier | H04L 1/1877 375/240.27 |
| 8,593,546 B2 * | 11/2013 | Kanemitsu | H04N 5/357 348/246 |
| 2015/0172539 A1 * | 6/2015 | Neglur | H04N 5/23206 348/207.1 |

* cited by examiner

*Primary Examiner* — Twyler Haskins
*Assistant Examiner* — Angel L Garces-Rivera
(74) *Attorney, Agent, or Firm* — McCarter & English, LLP; Scott J. Asmus

(57) ABSTRACT

Methods, systems, and computer readable media for video image recovery from transient blockage or corruption artifacts include receiving first and second data captures from an image sensor having first and second pluralities of pixel intensity values corresponding to pixel locations of the first and second data captures. The methods, systems, and computer readable media also include identifying in the second data capture, one or more of the second pixel intensity values exceeding a contrast threshold to detect a transient blockage. The methods, systems, and computer readable media also include replacing the one or more of the second pixel intensity values exceeding the contrast threshold with one or more of the first pixel intensity values to generate a corrected data capture.

17 Claims, 6 Drawing Sheets

VIDEO IMAGE RECOVERY FROM TRANSIENT BLOCKAGE OR CORRUPTION ARTIFACTS

RELATED APPLICATIONS

This application claims benefit of and priority to U.S. provisional application Ser. No. 62/066,404, filed Oct. 21, 2014, which is incorporated herein by reference in its entirety.

TECHNICAL FIELD

The present disclosure generally relates to image sensors, and more particularly to detection and minimization of transient blockages in image sensor images.

BACKGROUND

Image sensor systems often acquire a plurality of data captures (frames) at regular temporal intervals over a period of time. However, transient blockages (e.g., a helicopter rotor, landing gear, a person or object passing in front of the camera, pixelation from interference, or other such blockages or corruption artifacts), whether periodic or aperiodic, can intrude on one or more frames. Such transient blockage of images can, for example, disrupt continuity of an image feed (e.g., video or time lapse), result in false or missed detections in threat detection systems, or otherwise corrupt at least a portion of the captured image data. Nevertheless, conventionally, the frames including the transient blockage(s) are either used as-is or entirely discarded. However, discarding the blocked/corrupted frames introduces temporal discontinuities to the image feed, such as, for example, an unnatural "freezing" of the image content during the dropped frame or a visually perceptible blank frame displayed between two frames having image content, Discarding the blocked/corrupted frames also represents a total loss of data from the discarded frames.

Another conventional technique sets a detected intensity threshold to recognize a transient blockage. If the intensity threshold is exceeded, the conventional technique "erodes" the recognized blocked portion of the image by iteratively widening the estimated blockage size within the image until the detected intensity value matches the background intensity. The eroded region of the image is then discounted. However, this technique is highly processor intensive, time consuming, and must be performed individually for each optical sensor used in the threat detection system. Thus, this conventional technique does not deliver rapid results, especially for a size or weight limited host platform such as an aircraft or other vehicle. Additionally, because data from an individual sensor's field of view (FOV) is often at least partially corrupted by other factors (e.g., inclusion of the sun within the FOV), the "erosion" process can be negatively impacted by non-blockage high intensity portions of the image, rendering the erosion ineffective or detrimental to image quality.

SUMMARY

In one embodiment, a method for detection of transient blockage of images is provided. The method includes receiving, at a computing device, a first data capture from an image sensor, the first data capture including a plurality of first pixel intensity values corresponding to each of a plurality of pixel locations of the first data capture. The method also includes receiving, at the computing device, a second data capture from the image sensor, the second data capture including a plurality of second pixel intensity values corresponding to each of a plurality of pixel locations of the second data capture. The method also includes identifying, in the second data capture by a processing component of the computing device, one or more of the second pixel intensity values exceeding a contrast threshold stored in a memory component of the computing device to detect a transient blockage.

In another embodiment an imaging system is provided. The system includes an image sensor configured to capture image data. The system also includes a computing device in electronic communication with the image sensor. The computing device includes a memory component and a processing component. The memory component includes instructions that, when executed by the processing component, cause the computing device to receive a first data capture from an image sensor, the first data capture including a plurality of first pixel intensity values corresponding to each of a plurality of pixel locations of the first data capture. The memory component also includes instructions that, when executed by the processing component, cause the computing device to receive a second data capture from the image sensor, the second data capture including a plurality of second pixel intensity values corresponding to each of a plurality of pixel locations of the second data capture. The memory component also includes instructions that, when executed by the processing component, cause the computing device to identify, in the second data capture, one or more of the second pixel intensity values exceeding a contrast threshold stored in a memory component of the computing device to detect a transient blockage.

In another embodiment, a non-transitory computer-readable medium is provided. The non-transitory computer-readable medium includes instructions stored thereon that, when executed by a processing component, cause a computing device of a system for detection of transient blockage of images to receive, at the computing device, a first data capture from an image sensor, the first data capture including a plurality of first pixel intensity values corresponding to each of a plurality of pixel locations of the first data capture. The non-transitory computer-readable medium also includes instructions stored thereon that, when executed by a processing component, cause a computing device of a system for detection of transient blockage of images to receive, at the computing device, a second data capture from the image sensor, the second data capture including a plurality of second pixel intensity values corresponding to each of a plurality of pixel locations of the second data capture. The non-transitory computer-readable medium also includes instructions stored thereon that, when executed by a processing component, cause a computing device of a system for detection of transient blockage of images to identify, in the second data capture by the processing component of the computing device, one or more of the second pixel intensity values exceeding a contrast threshold stored in a memory component of the computing device to detect a transient blockage.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
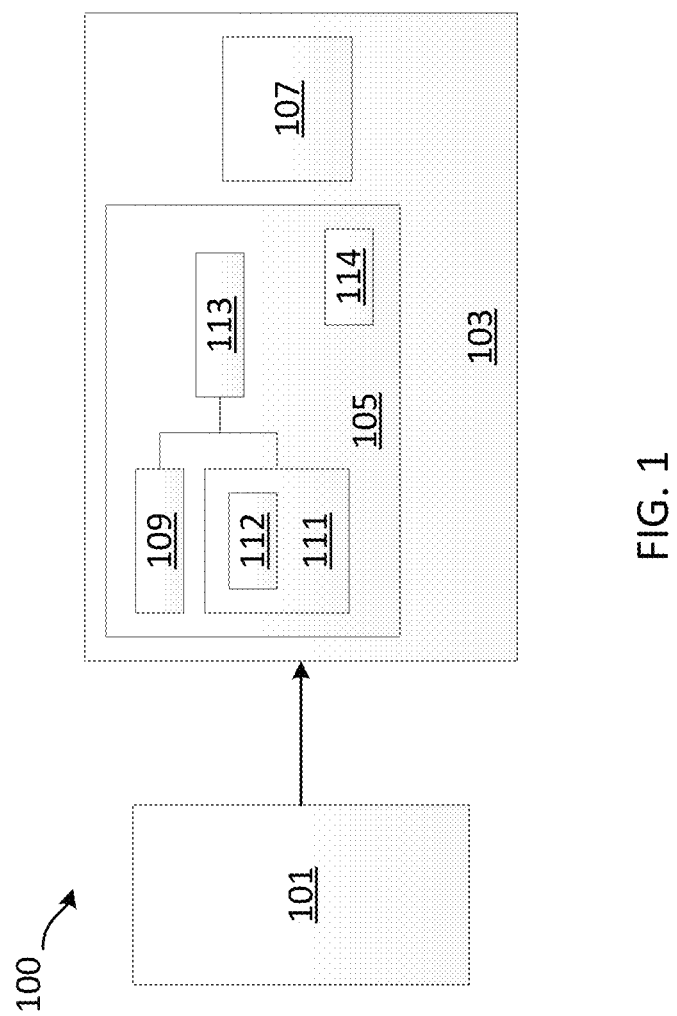
FIG. 1 is a block diagram showing a system for removal of transient blockage in image sensor images in accordance with various embodiments taught herein.

Methods, systems, and non-transitory computer-readable media disclosed herein teach detection and replacement of transient blockage of images or data captures (frames). Transient blockage, as used herein, refers to any form of transient blockage or corruption artifact introduced into one or more images or data captures (frames), whether periodic or aperiodic. Such transient blockage can include, for example, a helicopter rotor, landing gear, a person or object passing in front of the camera, pixelation from interference, other such blockages or corruption artifacts, or combinations thereof. Transient blockage is detected by comparing pixel intensity values of each image or frame to a contrast threshold such that pixel intensity values identified as exceeding the contrast threshold are detected as a transient blockage. The detected transient blockage is removed by replacing the pixel intensity values identified as exceeding the contrast threshold with pixel intensity values from a recent image or frame (e.g., a prior frame within an image feed such as a consecutively prior frame or the most recent frame having no transient blockage at the relevant blocked pixel locations).

Advantageously, because the correction is performed in real-time, no frames are dropped from the feed, and the replacement pixels are taken from a recent prior frame, the methods, systems, and non-transitory computer-readable media described herein remove the visual and temporal discontinuities (e.g., display of unintended content, image content freezing, or visually perceptible display of blank frames) associated with the transient blockage. Further advantageously, by removing the inappropriate contrast and incorrect pixel intensity values caused by the transient blockage, the potential false detections and artificial alterations of pre-existing tracks often associated with corruption introduced by transient blockage of images are avoided. Still further advantageously, because only the pixel locations corresponding to the transient blockage are removed, data loss is minimized, allowing, for example, video systems to preserve some progression of image content within the video feed, thus minimizing the risk that a viewer will perceive any difference between the intended image frame and the corrected image frame. However, it will be apparent in view of this disclosure that, even where an entire frame of the image feed is corrupted and thus replaced, the system avoids the blank frame displays and the true "freezing" of the content (as well as the abrupt restart that follows such events) associated with dropping frames. Thus, even where whole-frame replacement is required, the viewer is less likely to perceive any difference between the intended image frame and the corrected image frame. Furthermore, because only the pixel locations corresponding to the transient blockage are removed and data loss is thereby minimized, threat detection systems are able to detect new or tracked threats in the uncorrected portions of the image.

Referring now to FIG. 1, an imaging system 100 to detect and remove transient blockage of images includes an image sensor 101 configured to capture image data in a plurality of discrete data captures (frames) over time. The system also includes a computing device 103 having a processing component 107 and a memory component 105. The computing device 103 is configured to receive the plurality of frames from the image sensor 101. Each of the plurality of frames includes a corresponding plurality of pixel intensity values corresponding to each of a plurality of corresponding pixel locations within the field of view of the image sensor 101. For ease of explanation, FIG. 1 depicts a system 100 that has received, in consecutive order, a first data capture (frame) 109 including a plurality of first pixel intensity values and a second data capture (frame) 111 including a second plurality of pixel intensity values from the image sensor 101. However, it will be apparent in view of this disclosure that, in accordance with various embodiments, any number of frames can be received from the image sensor 101 at any desired time interval(s) such as, for example, 100 per second, one per second, one per minute, one per hour, one per day, any other suitable time interval, or combinations or patterns thereof.

Image sensor 101, in accordance with various embodiments, can be any suitable device such as, for example, but not limited to, digital cameras, infrared cameras, optical cameras, video cameras, infrared video cameras, charge-coupled device (CCD) sensors, complementary metal-oxide-semiconductor (CMOS) sensors, focal plane arrays, microbolometers, indium antimonide sensors, indium gallium arsenide sensors, mercury cadmium telluride sensors, quantum well infrared photodetectors, N-type metal-oxide-semiconductor (NMOS) sensors, medical imaging devices, x-ray detectors, any other image sensor, or combinations thereof. It will be apparent in view of this disclosure that the image sensor 101, in accordance with various embodiments can encompass any sensor configured to capture electromagnetic radiation in any spectrum for producing an image, including, for example, infrared radiation, visible light, ultraviolet radiation, x-rays, etc. In use, in accordance with various embodiments, the image sensor 101 records a plurality of data captures (frames) over time. The data associated with each frame can include spectral data (i.e., frequency of the received radiation) and intensity data (i.e., amplitude of the received radiation) for each pixel of the image sensor 101. The frame and associated data is then transmitted to or retrieved by the computing device 103.

Computing device 103, in accordance with various embodiments, can include one or more server systems, desktop computer devices, mobile computer devices, field-programmable gate arrays (FPGA), microprocessors, application specific integrated circuits, integrated circuits, monolithic integrated circuits, microchips, programmable logic devices, complex programmable logic devices, any other suitable devices capable of including both processing components 107 and memory components 105, or combinations thereof. The processing component 107 of the computing system 103 can include one or more logic blocks, logic gates, field-programmable gate arrays (FPGA), microprocessors, application specific integrated circuits, integrated circuits, monolithic integrated circuits, microchips, programmable logic devices, complex programmable logic devices, any other suitable processing devices, or combinations thereof. The memory component 105 can include a computational device memory or random access memory, such as DRAM, SRAM, EDO RAM, and the like as well as, for example, flip-flops, memory blocks, RAM blocks, programmable read-only memory, any other suitable type of digital or analog memory, or combinations thereof.

As illustrated by FIG. 1, the second frame 111 includes a transient blockage 112 (e.g., including a blockage or corruption artifact as described above). The first frame 109 is unblocked (i.e., does not include a transient blockage 112). In use, in accordance with various embodiments, the system 100, by the processing component 107, detects the transient blockage 112 by identifying at least one of the pixel intensity values of at least one of the frames (e.g., one or more of the second pixel intensity values of second frame 111 as shown) based on a contrast threshold 114 stored in the memory component 105.

The contrast threshold 114 can, for example, be set as a maximum change in pixel intensity between two or more adjacent pixels or groups of pixels. For example, the threshold can be set at a change in pixel intensity value of 100 counts between adjacent pixels. Alternatively, the threshold can be set at a change in pixel intensity value of 100 counts between a first pixel and a fourth pixel in a line of pixels. It will be apparent in view of this disclosure that any intensity change over any number of pixels within a pixel space of a frame can be used as a contrast threshold in accordance with various embodiments. Advantageously, the contrast threshold 114, by assessing intensity in relation to the other image content in the frame, can more reliably detect transient blockage as compared to, for example, an intensity threshold, which may discount lower-intensity blockage or inadvertently detect other corruption factors (e.g., large radiant sources such as sun) or even unexpectedly intense intended image content.

The system 100, by the processing component 107, is further configured to replace the identified one or more second pixel intensity values of the second frame 111 corresponding to the transient blockage 112 with one or more of the first pixel intensity values of the first frame 109 to generate a corrected second frame 113. In particular, the one or more of the first pixel intensity values for replacing the identified second pixel intensity values are each associated with a pixel location corresponding to the identified one or more second pixel intensity values. Thus the corrected second frame 113 includes pixel intensity values from the second data capture (frame) 111 for all unblocked pixel locations and includes pixel intensity values from the first data capture (frame) 109 for all pixel locations corresponding to the transient blockage 112.

The correction is performed in real-time. Consequently, no frames are dropped from the feed and the replacement pixels are taken from a recent prior frame (e.g., an adjacent prior frame or the most recent frame in a stream of frames having no transient blockage at the relevant blocked pixel locations). The methods, systems, and non-transitory computer-readable media described herein prevent the visual and temporal discontinuities (e.g., display of unintended content, image content freezing, or visually perceptible display of blank frames) associated with the transient blockage 112. Further advantageously, by removing the inappropriate contrast and incorrect pixel intensity values caused by the transient blockage 112, the system 100 is able to avoid the potential false detections and artificial alterations of pre-existing tracks often associated with corruption introduced by transient blockage of images. Still further advantageously, because only the pixel locations corresponding to the transient blockage 112 are removed, data loss is minimized, allowing, for example, video systems to preserve some progression of image content within the video feed, thus minimizing the risk that a viewer will perceive any difference between the intended image frame and the corrected image frame. However, it will be apparent in view of this disclosure that, even where an entire frame of the image feed is corrupted and thus replaced, the system avoids the blank frame displays and the true "freezing" of the content (as well as the abrupt restart that follows such events) associated with dropping frames. Thus, even where whole-frame replacement is required, the viewer is less likely to perceive any difference between the intended image frame and the corrected image frame. Furthermore, because only the pixel locations corresponding to the transient blockage are removed and data loss is thereby minimized, threat detection systems are able to detect new or tracked threats in the uncorrected portions of the image. Therefore, in accordance with various embodiments, the system 100 is able to rapidly and reliably detect and remove transient blockages 112 in data captures 109, 111 acquired by an image sensor 103 while using a minimum of processing resources.

It will be apparent in view of this disclosure that, in accordance with various embodiments, the computing device 103 can be co-located with the image sensor 101 (e.g., on a common mobile host platform or at a common recording or broadcast studio), the computing device 103 can be remotely located from the image sensor 101, or that the system 100 can include more than one computing device 103 such that one computing device 103 is co-located with the image sensor 101 and one computing device 103 is remotely located from the image sensor 101. For example, in various broadcast television applications, the computing device 103 can be co-located with the image sensor 101 at a broadcast studio or an event location (e.g., a sporting stadium) to permit the broadcaster to correct or remove transient blockage 112 introduced prior to transmission of the broadcast (e.g., a person or object transiting the field of view of the image sensor 101, unintended temporary nudity in violation of FCC regulation, or any other transient blockage 112). With further reference to example broadcast television applications, the computing device 103 (or one or more additional computing devices) can be remotely located from the image sensor 101 at, for example, a consumer-viewer video receiver such as a TV, smart TV, ATSC tuner, digital video recorder (DVR), cable box, smart phone, tablet, laptop computer, desktop computer, any other video receiver, or combinations thereof. In such configurations, the system 100 is permitted to remove or correct any pixelation or other transient blockage 112 introduced after transmission of the broadcast by, for example, electronic or atmospheric interference, signal degradation, or any other source of transient blockage 112.

In various threat detection system applications, for example, the computing device 103 can be co-located with the image sensor 101 on a common mobile host platform (e.g., a helicopter, other aircraft, a ship, a boat, a tank, a train, or other mobile host platform) to permit the system to correct or remove transient blockage 112 for rapid threat detection and response for protection of the mobile host platform. With further reference to example threat detection system applications, the computing device 103 (or one or more additional computing devices) can be remotely located from the image sensor 101 at, for example, another mobile host platform or a fixed central command location. In such configurations, the system 100 can remove or correct any pixelation or other transient blockage 112 for larger-scale strategic threat detection, mapping, and warning.

Figure 2A:
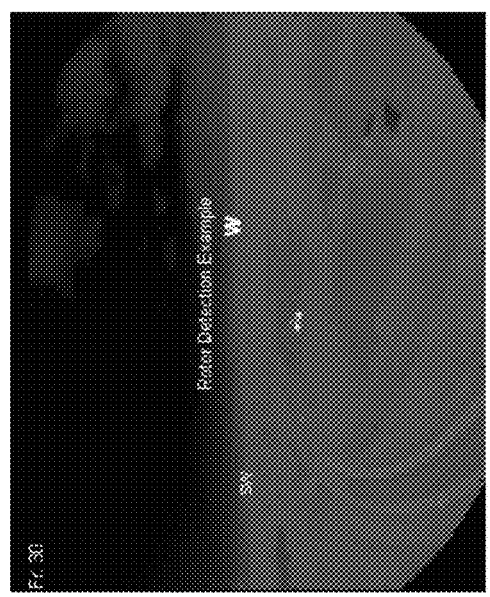
FIG. 2A is an image illustrating an unblocked data capture acquired by an image sensor in accordance with various embodiments taught herein.
Figure 2B:
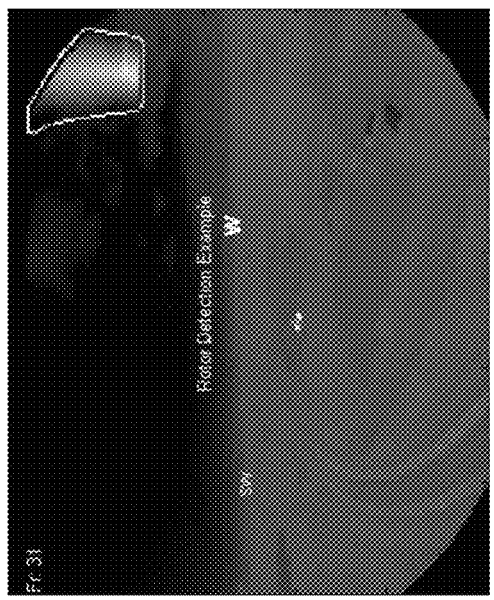
FIG. 2B is an image illustrating a data capture including a transient blockage in accordance with various embodiments taught herein.
Figure 2C:
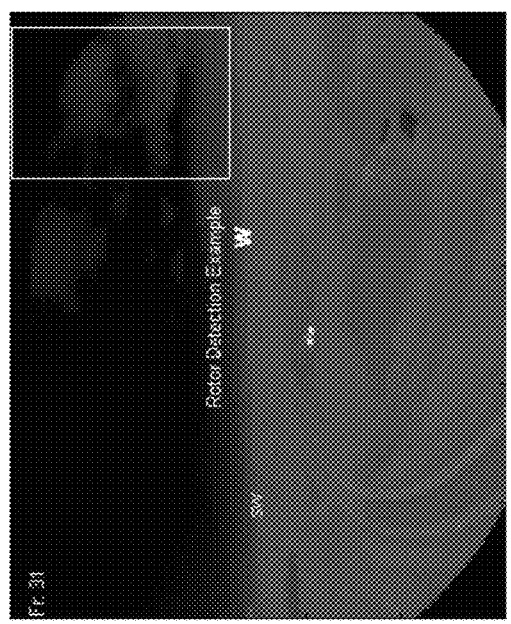
FIG. 2C is an image illustrating the data capture of FIG. 2B with the transient blockage removed in accordance with various embodiments taught herein.

FIGS. 2A-2C are exemplary images generated using the systems and methods described herein. In particular, FIG. 2A is a $30^{th}$ frame of a one hundred frame per second image feed. As depicted in FIG. 2A, the $30^{th}$ frame is free of any blockage. FIG. 2B is a $31^{st}$ frame of the one hundred frame per second image feed acquired by the same image sensor as the $30^{th}$ frame of FIG. 2A. As depicted in FIG. 2B, the image includes a transient blockage in the upper right hand corner, a portion of a helicopter rotor. FIG. 2C is a corrected $31^{st}$ frame, wherein the pixel intensity values of the $31^{st}$ frame associated with the transient blockage (i.e., the helicopter rotor) have been removed from the frame and replaced with corresponding pixel intensity values from the $30^{th}$ frame. As depicted in FIG. 2C, a minimum amount of the usable image data from the $31^{st}$ frame has been lost and the replacement pixels are able to replace the transient blockage, thereby removing the visual and temporal discontinuities associated with the transient blockage.

Figure 3:
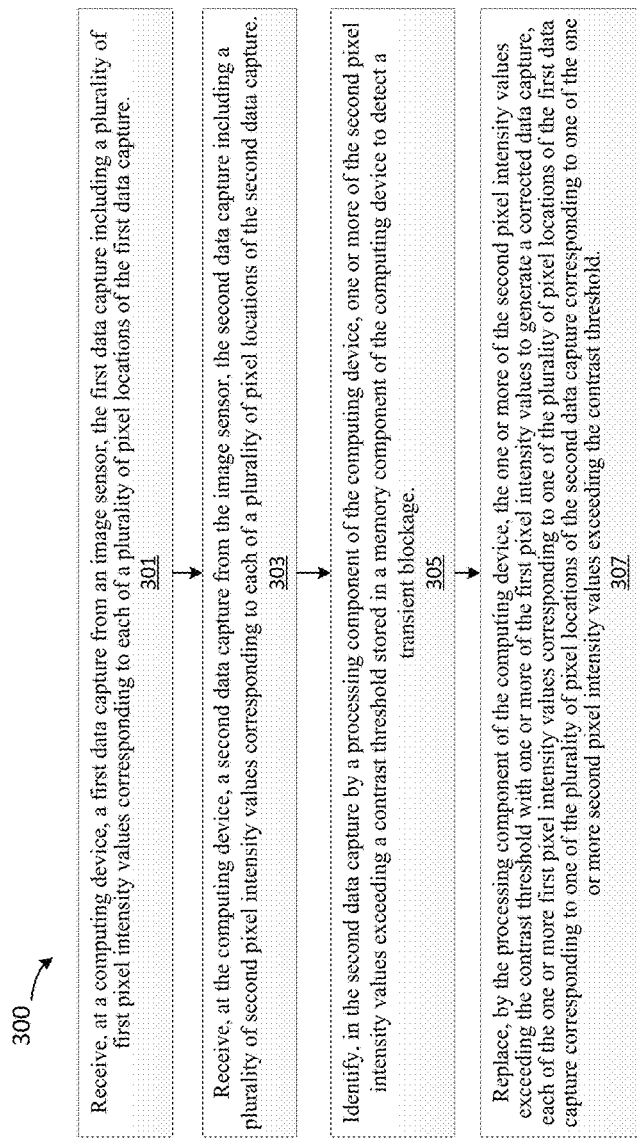
FIG. 3 is a flow chart illustrating a method for removal of transient blockage in accordance with various embodiments taught herein.

Referring now to FIG. 3, a method 300 is provided that is performed by embodiments of the system for detection of transient blockage of images. The method includes a step 301 of receiving, at a computing device, a first data capture from an image sensor, the first data capture including a plurality of first pixel intensity values corresponding to each of a plurality of pixel locations of the first data capture. The method also includes a step 303 of receiving, at the computing device, a second data capture from the image sensor, the second data capture including a plurality of second pixel intensity values corresponding to each of a plurality of pixel locations of the second data capture. At step 305, the method includes identifying, in the second data capture by a processing component of the computing device, one or more of the second pixel intensity values exceeding a contrast threshold stored in a memory component of the computing device to detect a transient blockage. In accordance with some embodiments, the method includes a step 307 of replacing, by the processing component of the computing device, the one or more of the second pixel intensity values exceeding the contrast threshold with one or more of the first pixel intensity values to generate a corrected data capture, each of the one or more first pixel intensity values corresponding to one of the plurality of pixel locations of the first data capture corresponding to one of the plurality of pixel locations of the second data capture corresponding to one of the one or more second pixel intensity values exceeding the contrast threshold. In accordance with other embodiments, step 307 is not performed.

The step 301 of receiving, at a computing device, a first data capture from an image sensor, the first data capture including a plurality of first pixel intensity values corresponding to each of a plurality of pixel locations of the first data capture can be performed, for example, but not limited to, using the image sensor 101 and the computing device 103 as described above with reference to FIG. 1. The step 303 of receiving, at the computing device, a second data capture from the image sensor, the second data capture including a plurality of second pixel intensity values corresponding to each of a plurality of pixel locations of the second data capture can be performed, for example, but not limited to, using the image sensor 101 and the computing device 103 as described above with reference to FIG. 1.

The step 305 of identifying, in the second data capture by a processing component of the computing device, one or more of the second pixel intensity values exceeding a contrast threshold stored in a memory component of the computing device to detect a transient blockage can be performed, for example, but not limited to, using the computing device 103 having the processing component 107 and the memory component 105 to compare pixel intensity values of a plurality of pixel locations of a plurality of frames (e.g., the first frame 109 and the second frame 111) to the contrast threshold 114 stored in the memory component 105 to detect the transient blockage 112 as described above with reference to FIGS. 1 and 2A-2C. The step 307 of replacing, by the processing component of the computing device, the one or more of the second pixel intensity values exceeding the contrast threshold with one or more of the first pixel intensity values to generate a corrected data capture, each of the one or more first pixel intensity values corresponding to one of the plurality of pixel locations of the first data capture corresponding to one of the plurality of pixel locations of the second data capture corresponding to one of the one or more second pixel intensity values exceeding the contrast threshold can be performed, for example, but not limited to, using the computing device 103 having the processing component 107 and the memory component 105 to replace one or more pixels intensity values of the second frame 111 corresponding to the transient blockage 112 with one or more pixel intensity values of the first frame 109 corresponding to one or more pixel locations of the first frame corresponding to one or more pixel locations of the second frame corresponding to the transient blockage 112 to produce the corrected image 113 as described above with reference to FIGS. 1 and 2A-2C.

Exemplary Distributed Imaging Systems

Figure 4:
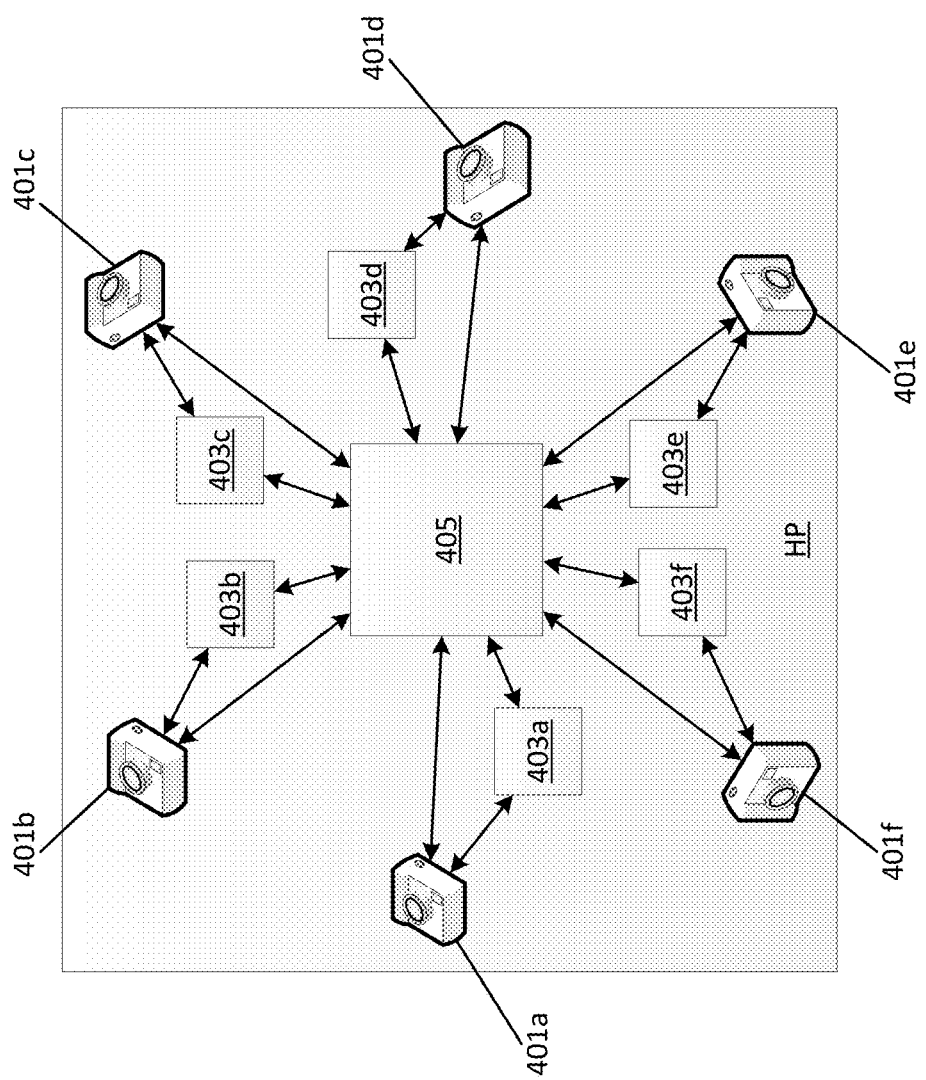
FIG. 4 is an example imaging system block diagram depicting various components which can be used to implement various embodiments in a distributed on-board imaging system in accordance with various embodiments taught herein.

FIG. 4 is an example imaging system block diagram of an exemplary distributed on-board imaging system 400. The on-board imaging system 400 can be installed on a host platform (HP). The system 400 includes a plurality of image sensors 401*a-f* installed on the HP, each of the image sensors 401*a-f* being in electronic communication with at least one of a plurality of dedicated processors 403*a-f* or a central processor 405 installed on the HP. As illustrated in FIG. 4, each image sensor 401*a-f* is in electronic communication with both the dedicated processor 403*a-f* and a central processor 405. However, it will be apparent in view of this disclosure that, in accordance with various embodiments, one or more of the image sensors 401*a-f* may communicate exclusively with the central processor 405. It will further be apparent in view of this disclosure that, in accordance with various embodiments, one or more of the image sensors 401*a-f* may connect exclusively with one of the dedicated processors 403*a-f*. It will still further be apparent in view of this disclosure that any combination of sensors per processor or processors per sensor can be used in accordance with various embodiments.

Image sensors 401*a-f* can be any suitable device such as, for example, but not limited to, digital cameras, infrared cameras, optical cameras, video cameras, infrared video cameras, charge-coupled device (CCD) sensors, complementary metal-oxide-semiconductor (CMOS) sensors, focal plane arrays, microbolometers, indium antimonide sensors, indium gallium arsenide sensors, mercury cadmium telluride sensors, quantum well infrared photodetectors, N-type metal-oxide-semiconductor (NMOS) sensors, medical imaging devices, x-ray detectors, any other image sensor, or combinations thereof. It will be apparent in view of this disclosure that image sensors 401*a-f*, in accordance with various embodiments can encompass any sensor configured to capture electromagnetic radiation in any spectrum for producing an image, including, for example, infrared radiation, visible light, ultraviolet radiation, x-rays, etc.

Dedicated processors 403*a-f* and central processor 405 can each include, for example, one or more field-programmable gate arrays (FPGA), microprocessors, application specific integrated circuits, integrated circuits, monolithic integrated circuits, microchips, programmable logic devices, complex programmable logic devices, any other suitable processing devices, or combinations thereof. For example, in some embodiments, each dedicated processor 403*a-f* can be a FPGA for providing temporary storage of a limited number of data captures acquired by the corresponding image sensor 401*a-f* and a coarse initial analysis while the central processor 405 can be a microprocessor for conducting more detailed analysis as needed. In various embodiments, the central processor 405 can perform all processing functions, eliminating the need for dedicated processors 403*a-f*. In various embodiments, the dedicated processors 403*a-f* can perform all processing functions, eliminating the need for a central processor 405. It will be apparent in view of this disclosure that any other combinations or ratios of processors and image sensors can be used in accordance with various embodiments.

Figure 5:
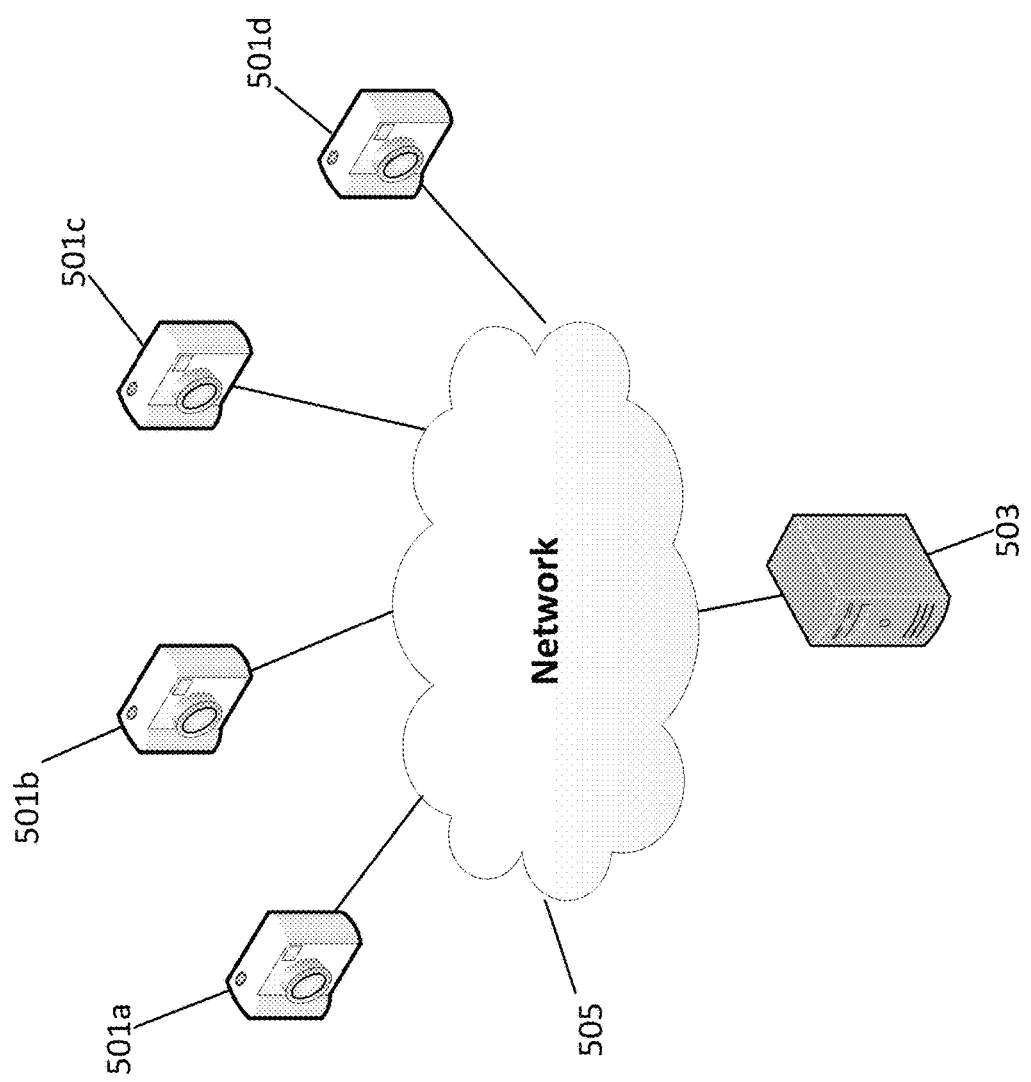
FIG. 5 is an example imaging system block diagram depicting various components which can be used to implement various embodiments in a distributed remote imaging system as taught herein.

FIG. 5 is an example imaging block diagram of certain distributed embodiments. Although FIGS. 1 and 4 and portions of the exemplary discussion above, make reference to a centralized system 100 operating with on one or more co-located image sensors or computing devices, one will recognize that various of the components and modules within the system 100 may instead be distributed across a network 505 in separately or remotely located image sensors 501*a-d* such as digital cameras, infrared cameras, optical cameras, video cameras, infrared video cameras, charge-coupled device (CCD) sensors, complementary metal-oxide-semiconductor (CMOS) sensors, focal plane arrays, microbolometers, indium antimonide sensors, indium gallium arsenide sensors, mercury cadmium telluride sensors, quantum well infrared photodetectors, N-type metal-oxide-semiconductor (NMOS) sensors, medical imaging devices, x-ray detectors, any other image sensor, or combinations thereof and computing devices 503 such as one or more server systems, desktop computer devices, mobile computer devices, field-programmable gate arrays (FPGA), microprocessors, application specific integrated circuits, integrated circuits, monolithic integrated circuits, microchips, programmable logic devices, complex programmable logic devices, any other suitable processing devices, or combinations thereof. As one example, data captures acquired by the image sensors 501*a-d* can be received by the remote computing device(s) 503 for detection of transient blockage of images. In some embodiments, the remote computing device(s) 503 can provide feedback to one or more of the image sensors 501*a-d* based on the detection of transient blockage of images. In some distributed remote imaging systems, the image sensors 501*a-d* and computing devices 503 of the system 100 can be separately located and can be in communication with one another across the network 505.

Exemplary Computing Devices

Figure 6:
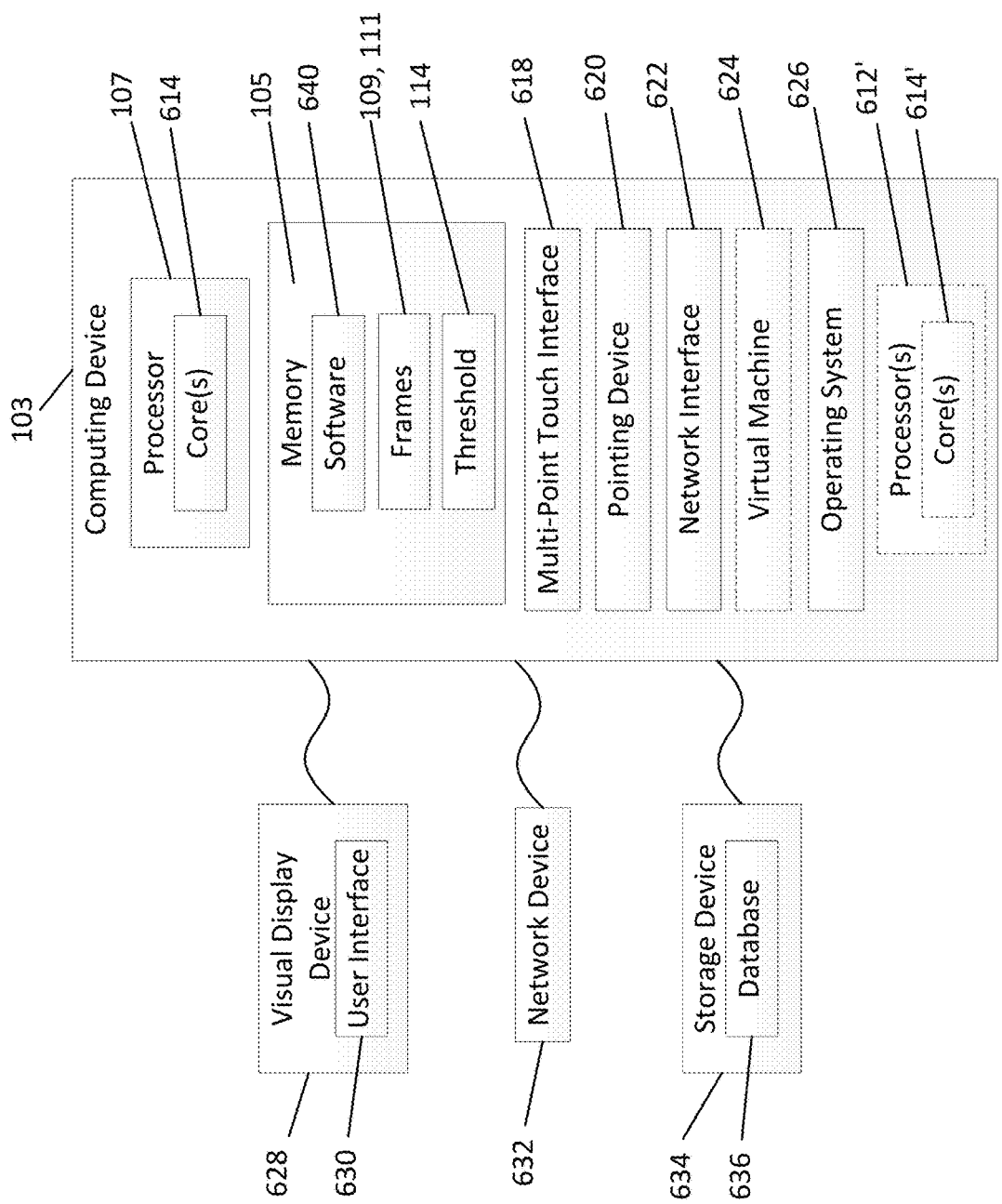
FIG. 6 is an example computational device block diagram depicting various components which can be used to implement various embodiments as taught herein.

FIG. 6 is a block diagram of the exemplary computing device 103 or portions thereof, in accordance with various embodiments and, for clarity, refers back to and provides greater detail regarding various elements of the system 100 of FIG. 1. The computing device 103 can include one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 105 included in the computing device 103 can store computer-readable and computer-executable instructions or software for performing the operations disclosed herein. For example, the memory 105 can store a software application 640 which is configured to perform various of the disclosed operations (e.g., identifying a transient blockage 112 in a second frame 111 received from an image sensor 101 and replacing one or more second pixel intensity values of the second frame 111 corresponding to the transient blockage 112 with one or more first pixel intensity values of the first frame 109). The computing device 103 can also include configurable and/or programmable processor 107 and an associated core 614, and optionally, one or more additional configurable and/or programmable processing devices, e.g., processor(s) 612' and associated core(s) 614' (for example, in the case of computational devices having multiple processors/cores), for executing computer-readable and computer-executable instructions or software stored in the memory 105 and other programs for controlling system hardware. Processor 107 and processor(s) 612' can each be a single core processor or multiple core (614 and 614') processor. In some embodiments, processor 107 and processor(s) 612' can each be one or more of a field-programmable gate array, a microprocessor, an application specific integrated circuit, integrated circuit, a monolithic integrated circuit, a microchip, a programmable logic device, a complex programmable logic device, any other suitable processing device, or combinations thereof.

Virtualization can be employed in the computing device 103 so that infrastructure and resources in the computing device can be shared dynamically. A virtual machine 624 can be provided to handle a process running on multiple processors so that the process appears to be using only one computing resource rather than multiple computing resources. Multiple virtual machines can also be used with one processor.

Memory 105 can include a computational device memory or random access memory, such as DRAM, SRAM, EDO RAM, and the like. Memory 105 can also include, for example, flip-flops, memory blocks, RAM blocks, programmable read-only memory, and the like. Memory 105 can include other types of memory as well or combinations thereof.

A user can interact with the computing device 103 through a visual display device 628, such as a computer monitor, which can display one or more user interfaces 630 that can be provided in accordance with exemplary embodiments. The computing device 103 can include other I/O devices for receiving input from a user, for example, a keyboard or any suitable multi-point touch interface 618, or a pointing device 620 (e.g., a mouse). The keyboard 618 and the pointing device 620 can be coupled to the visual display device 628. The computing device 103 can include other suitable conventional I/O peripherals.

The computing device 103 can also include one or more storage devices 634, such as a hard-drive, CD-ROM, or other computer readable media, for storing data and computer-readable instructions and/or software that perform operations disclosed herein. Exemplary storage device 634 can also store one or more databases 636 for storing any suitable information required to implement exemplary embodiments. The databases 636 can be updated manually or automatically at any suitable time to add, delete, and/or update one or more items in the databases.

The computing device 103 can include a network interface 622 configured to interface via one or more network devices 632 with one or more networks, for example, Local Area Network (LAN), Wide Area Network (WAN) or the Internet through a variety of connections including, but not limited to, standard telephone lines, LAN or WAN links (for example, 802.11, T1, T6, 56 kb, X.25), broadband connections (for example, ISDN, Frame Relay, ATM), wireless connections, controller area network (CAN), or some combination of any or all of the above. The network interface 622 can include a built-in network adapter, network interface card, PCMCIA network card, card bus network adapter, wireless network adapter, USB network adapter, modem or any other device suitable for interfacing the computing device 103 to any type of network capable of communication and performing the operations described herein. Moreover, the computing device 103 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 103 can run any operating system 626, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 626 can be run in native mode or emulated mode. In an exemplary embodiment, the operating system 626 can be run on one or more cloud machine instances.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A method for detection of transient blockage of images comprising the steps of:
  receiving, at a computing device, a first data capture from an image sensor, the first data capture including a plurality of first pixel intensity values corresponding to each of a plurality of pixel locations of the first data capture;
  receiving, at the computing device, a second data capture from the image sensor, the second data capture including a plurality of second pixel intensity values corresponding to each of a plurality of pixel locations of the second data capture;
  identifying, in the second data capture by a processing component of the computing device, one or more of the second pixel intensity values exceeding a contrast threshold stored in a memory component of the computing device to detect a transient blockage; and
  replacing the one or more of the second pixel intensity values exceeding the contrast threshold with one or more of the first pixel intensity values to generate a corrected data capture, each of the one or more first pixel intensity values corresponding to one of the plurality of pixel locations of the first data capture corresponding to one of the plurality of pixel locations of the second data capture corresponding to one of the one or more second pixel intensity values exceeding the contrast threshold.

2. The method of claim 1, further comprising the step of receiving, at the computing device, a third data capture from the image sensor, the third data capture including a plurality of third pixel intensity values corresponding to each of a plurality of pixel locations of the third data capture.

3. The method of claim 2, wherein the first data capture, the second data capture, and the third data capture comprise consecutive frames of a raw image feed received from the image sensor.

4. The method of claim 3, further comprising the step of replacing the second data capture of the raw image feed with the corrected data capture to generate a corrected image feed.

5. The method of claim 1, wherein the image sensor and the computing device are installed on a common mobile host platform.

6. The method of claim 1, wherein the computing device is located remotely from the image sensor and the image sensor and the computing device are in electronic communication via a communications network.

7. An imaging system comprising:
  an image sensor configured to capture image data; and
  a computing device in electronic communication with the image sensor having a memory component and a processing component, the memory component including instructions that, when executed by the processing component, cause the computing device to:
    receive a first data capture from an image sensor, the first data capture including a plurality of first pixel intensity values corresponding to each of a plurality of pixel locations of the first data capture;
    receive a second data capture from the image sensor, the second data capture including a plurality of second pixel intensity values corresponding to each of a plurality of pixel locations of the second data capture;

identify, in the second data capture, one or more of the second pixel intensity values exceeding a contrast threshold stored in a memory component of the computing device to detect a transient blockage; and replace the one or more of the second pixel intensity values exceeding the contrast threshold with one or more of the first pixel intensity values to generate a corrected data capture, each of the one or more first pixel intensity values corresponding to one of the plurality of pixel locations of the first data capture corresponding to one of the plurality of pixel locations of the second data capture corresponding to one of the one or more second pixel intensity values exceeding the contrast threshold.

8. The system of claim 7, the memory component further including instructions that, when executed by the processing component, cause the computing device to receive a third data capture from the image sensor, the third data capture including a plurality of third pixel intensity values corresponding to each of a plurality of pixel locations of the third data capture.

9. The system of claim 8, wherein the first data capture, the second data capture, and the third data capture comprise consecutive frames of a raw image feed received from the image sensor.

10. The system of claim 9, the memory component further including instructions that, when executed by the processing component, cause the computing device to replace the second data capture of the raw image feed with the corrected data capture to generate a corrected image feed.

11. The system of claim 7, wherein the image sensor and the computing device are installed on a common mobile host platform.

12. The system of claim 7, wherein the computing device is located remotely from the image sensor and the image sensor and the computing device are in electronic communication via a communications network.

13. The system of claim 7, wherein:
the image sensor is one of a plurality of image sensors installed on a common host platform, each of the image sensors configured to capture image data; and
the computing device is one of a plurality of dedicated computing devices installed on the common host platform, each of the dedicated computing devices in electronic communication with a corresponding one of the image sensors and having a dedicated memory component and a dedicated processing component.

14. A non-transitory computer-readable medium including instructions stored thereon that, when executed by a processing component, cause a computing device of a system for detection of transient blockage of images to:
receive, at the computing device, a first data capture from an image sensor, the first data capture including a plurality of first pixel intensity values corresponding to each of a plurality of pixel locations of the first data capture;

receive, at the computing device, a second data capture from the image sensor, the second data capture including a plurality of second pixel intensity values corresponding to each of a plurality of pixel locations of the second data capture;

identify, in the second data capture by the processing component of the computing device, one or more of the second pixel intensity values exceeding a contrast threshold stored in a memory component of the computing device to detect a transient blockage; and replace the one or more of the second pixel intensity values exceeding the contrast threshold with one or more of the first pixel intensity values to generate a corrected data capture, each of the one or more first pixel intensity values corresponding to one of the plurality of pixel locations of the first data capture corresponding to one of the plurality of pixel locations of the second data capture corresponding to one of the one or more second pixel intensity values exceeding the contrast threshold.

15. The non-transitory computer-readable medium of claim 14, further including instructions stored thereon that, when executed by a processing component, cause the computing device of the system for detection of transient blockage of images to receive, at the computing device, a third data capture from the image sensor, the third data capture including a plurality of third pixel intensity values corresponding to each of a plurality of pixel locations of the third data capture.

16. The non-transitory computer-readable medium of claim 15, wherein the first data capture, the second data capture, and the third data capture comprise consecutive frames of a raw image feed received from the image sensor.

17. The non-transitory computer-readable medium of claim 16, further including instructions stored thereon that, when executed by a processing component, cause a computing device of a system for detection of transient blockage of images to replace the second data capture of the raw image feed with the corrected data capture to generate a corrected image feed.

* * * * *